United States Patent [19]

Cook

[11] 4,425,940
[45] Jan. 17, 1984

[54] PRESSURE CONTROL SYSTEM

[75] Inventor: John E. Cook, Chatham, Canada

[73] Assignee: Canadian Fram Limited, Canada

[21] Appl. No.: 250,340

[22] Filed: Apr. 2, 1981

[51] Int. Cl.³ .......................................... F16K 11/14
[52] U.S. Cl. ................................. 137/627.5; 60/289;
 60/306; 137/543.15; 137/869; 137/871
[58] Field of Search ........................ 60/289, 290, 306;
 137/543.15, 627.5, 869, 871

[56] References Cited

U.S. PATENT DOCUMENTS

| | | |
|---|---|---|
| 2,875,784 | 3/1959 | Cole .................. 137/625.5 |
| 2,944,564 | 7/1960 | Pettey ................... 137/529 |
| 3,556,137 | 1/1971 | Billeter et al. ............. 137/543.15 |
| 3,748,855 | 7/1973 | Day ...................... 60/290 |
| 3,777,773 | 12/1973 | Tolbert ............... 137/596.13 X |
| 3,924,409 | 12/1975 | Heilman et al. ............ 60/306 X |
| 4,199,939 | 4/1980 | Hattori . |
| 4,211,074 | 7/1980 | Hattori . |
| 4,232,517 | 11/1980 | Sumiyoshi et al. . |
| 4,269,028 | 5/1981 | Hattori ................. 60/289 X |
| 4,327,772 | 5/1982 | Kawabata .............. 60/289 X |

FOREIGN PATENT DOCUMENTS 2447461 8/1980 France .

*Primary Examiner*—Gerald A. Michalsky
*Attorney, Agent, or Firm*—Markell Seitzman; Russel C. Wells

[57] ABSTRACT

A pressure control system for use in vehicle emissions control includes an air control valve (12) having a housing (14) defining an inlet (16) communicated to the vehicle air pump and a pair of outlets (18, 20). A primary valve assembly (22) controls communication between the inlet (16) and the outlets (18, 20) and includes a pair of valve members (54, 56) actuated by a differential pressure responsive diaphragm assembly (39). The pressure differential across the diaphragm assembly (39) is controlled by a pressure signal generated from a pressure tap (84) from the inlet (16). A pair of solenoid valves (88, 92) controls communication to the diaphragm assembly and to a pressure responsive relief valve assembly (60) which controls communication between the inlet (16) and an atmospheric vent (78).

5 Claims, 1 Drawing Figure

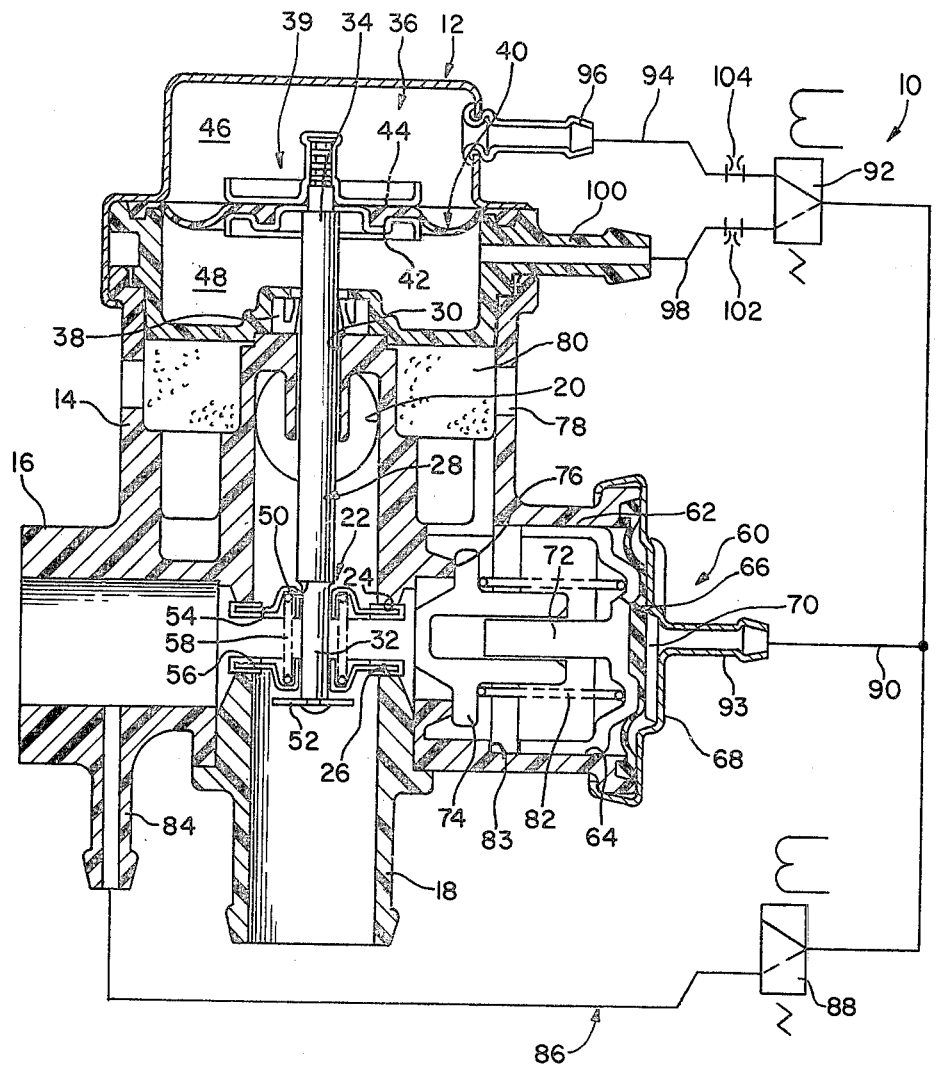

PRESSURE CONTROL SYSTEM

This invention relates to a pressure control system.

Secondary air control valves have been used on motor vehicles for the past several years as a component of the vehicle emissions control system. These valves include a housing having an inlet communicated to a fluid pressure source (such as the vehicle air pump) providing a pressure level greater than atmospheric pressure and a pair of outlets, primary valve means controlling communication between the inlet and the outlets, the primary valve means including a pressure differential responsive piston for actuating the primary valve means for a first condition in which said primary valve means closes one of said outlets and communicates the other of the outlets to the inlet, the primary valve means being actuable to a second condition in which the primary valve means closes the other of the outlets and opens the one outlet to the inlet.

For example, in U.S. Pat. No. 3,948,045 an air control valve is disclosed which diverts air between upstream and downstream injection points and also vents the air pump to atmosphere under certain conditions. However, the valve disclosed in this patent is vacuum actuated, and is not susceptible to control by the microprocessors now used on modern vehicles. Furthermore, venting of air pressure to atmosphere requires the pressure to build up within the valve until a relief valve is forced open and there is no provision to control the valve as a function of engine operating conditions.

The present invention avoids the aforementioned drawbacks of the above-identified prior art valve by using the output of the air pump, instead of manifold vacuum pressure, to control the valve. By using solenoid valves to control communication of a pressure signal generated by the air pump, the valve disclosed herein facilitates control by microprocessors.

Accordingly, the pressure control system of the present invention is characterized in that the inlet includes a pressure tap for generating a pressure signal from the pressure level communicated to said inlet from the pressure source, conduit means including a pair of branches for communicating said pressure signal from the tap to opposite sides of the pressure differential responsive piston, and electrically actuated valve means control communication through the branches to cause the piston to actuate the valve means between the first and second conditions.

Therefore, the device disclosed in the present application has the advantage of simplifying the air injection control valve known to the prior art because only a single diaphragm and piston assembly is necessary to control communication between the upstream and downstream injection points. Another advantage of the present invention is that it facilitates automatic control of the switching function by electronic controllers. A further advantage of the present invention is that it uses air pump pressure to perform the switching function instead of manifold vacuum. This feature not only facilitates automatic electronic control of the switching function, but also insures proper switching of the valve, since under some conditions in modern automobiles the vacuum levels available in the induction manifold are insufficient to operate all of the various valves and controls necessary on a modern vehicle.

Other features and advantages will appear in the following description with reference to the accompanying drawings, the sole FIGURE of which is a schematic illustration of a pressure control system made pursuant to the teaching of my present invention, with the air injection control valve used therein illustrated in longitudinal cross-section.

Referring now to the drawing, a pressure control system 10 is a part of the emission control systems of a motor vehicle having an engine and a catalytic converter (not shown) and includes an air control valve generally indicated by the numeral 12. The air control valve 12 includes a housing 14 having an inlet 16 which is connected to the vehicle air pump. The air pump is a belt-driven engine accessory that is turned by the vehicle engine and produces an output at a pressure level above atmospheric. The housing 14 further includes an outlet port 18 which is communicated to the upstream injection point at the vehicle cylinder heads. Another outlet port 20 is communicated to the downstream injection point at the vehicle catalytic converter. A primary valve assembly generally indicated by the numeral 22 controls communication between the inlet 16 and the outlet ports 18, 20. The valve assembly 22 includes a pair of circumferentially extending, oppositely facing valve seat areas 24, 26. The valve seat 24 defines a passage communicating with the outlet 20 and the valve seat 26 defines a passage communicating with the outlet port 18. A plunger 28 is slidably received within a bore 30 defined within the housing 14. One end of the plunger 28 terminates in a reduced diameter section 32 and the opposite end 34 of the plunger 28 projects from the bore 30 into an actuation chamber 36 defined within the housing 14. An annular seal 38 prevents communication through the bore 30 from the actuation chamber 48 to the outlet ports 20 and 18 or the inlet 16.

A diaphragm assembly generally indicated by the numeral 39 is carried on the end 34 of the plunger 28 within the chamber 36. The diaphragm assembly 39 includes an annular flexible member 40, the outer circumferential edge of which is clamped to the wall of the housing 14. The inner circumferential edge of the flexible member 40 is clamped between diaphragm retaining plates 42, 44 which are carried on the end 34 of the plunger 28. Accordingly, the diaphragm assembly 39 divides the actuating chamber 36 into an upper compartment 46 and a lower compartment 48. Therefore, pressure differentials between the compartments 46, 48 will cause the diaphragm assembly to move upwardly and downwardly viewing the FIGURE, depending upon the relative pressures in the compartments 46, 48. The plunger 28 moves with the diaphragm assembly 39 since the plunger 28 is secured to the assembly 39.

Referring now to the reduced diameter end 32 of the plunger 28, the juncture of the reduced diameter end 32 with the remaining portion of the plunger 28 defines a shoulder 50 therebetween. A retaining washer 52 is provided at the end of the reduced diameter portion 32. A pair of valve members 54, 56 is slidably mounted on the reduced diameter portion 32. A spring 58 yieldably biases the valve members 54, 56 apart, yieldably urging the members 54 and 56 towards the shoulder 50 and retaining washer 52, respectively. When there is no pressure differential across the diaphragm assembly 39 so that actuating force on the plunger is zero, the spring 58 urges the valve members 54, 56 into sealing engagement with the corresponding valve seats 24 and 26, respectively.

A relief valve assembly generally indicated by the numeral 60 is mounted in a boss 62 which projects from the wall of the housing 14. The boss 62 defines a bore 64 therewithin which slidably receives a piston 66. The piston 66 cooperates with the transverse wall 68 of the boss 62 to define a pressure chamber 70 therewithin. A support or mount 72 projects axially from the side of the piston 66 opposite the side exposed to the pressure level in the chamber 70. A valve member 74 is slidably mounted on the mount 72 and cooperates with a circumferentially extending valve seating area 76 to control communication between the inlet 16 and a vent 78 which communicates the bore 64 with atmosphere. Silencing material 80 is interposed between the bore 64 and the vent 78 to silence the air escaping through the vent 78. A spring 82 disposed between the valve member 74 and the piston 66 yieldably urges the valve member into sealing engagement with the seat 76. It will be noted that the preload of the spring 82 can be changed by moving the piston 66 toward or away from engagement with a shoulder 83 on the wall of bore 64.

An air tap 84 off the inlet 16 provides an air supply to a conduit generally indicated by the numeral 86. A solenoid valve 88 is provided in the conduit 86 upstream of a branch 90 which communicates with an inlet 93 to the pressure chamber 70. The normal condition of the solenoid 88 is indicated schematically by the solid line in which communication across the solenoid valve is discontinued and the portion of the conduit 86 downstream of the valve 88 is vented to atmosphere. The valve 88 is actuable to an applied position indicated by the dashed lines in the FIGURE in response to a signal causing current to flow through the solenoid. In the applied condition, the portions of the conduit 86 upstream and downstream of the solenoid valve 88 are communicated with one another. A second solenoid valve 92 is installed in the conduit 86 downstream from the solenoid valve 88 and splits the conduit 86 into a first branch 94 which communicates with the compartment 46 through inlet port 96 and a second branch 98 communicating with the compartment 48 of actuating chamber 36 through the inlet 100. The valve 92 is actuable from a normal condition illustrated by the solid line in the drawing in which the branch 94 is communicated with the solenoid valve 88 and the branch 98 is vented to atmosphere through bleed orifice 102. Valve 92 is actuable to an actuated condition illustrated by the dashed lines in the FIGURE in which the branch 98 is communicated with the solenoid valve 88 and the branch 94 is communicated to atmosphere through bleed orifice 104.

In operation, the various components of the control system 12 are illustrated in the drawing in the positions which they assume when the output of the air pump is to communicate to atmosphere. In this condition, the solenoid valve 88 is deactuated, thereby communicating that portion of the conduit 86 upstream of the valve 88 to atmosphere. Accordingly, atmospheric pressure will be communicated to both compartments 46 and 48 of actuating chamber 36 so that there will be no pressure differential across the diaphragm assembly 39. Therefore, the spring 58 yieldably maintains the valve elements 54, 56 in sealing engagement with the corresponding valve seats 24 and 26 so that all of the air pressure communicated through the inlet 16 from the air pump (except that bled off through the tap 84) is communicated to the vent 78 through the valve seat 76 and the bore 64. Of course, since the pressure chamber 70 is also vented, the preload on spring 82 will be relatively small so that only a very small pressure differential is sufficient to hold the valve member 74 away from the valve seat 76 to allow pressure to communicate to the vent 78.

When the aforementioned onboard microprocesser senses a vehicle operating condition in which it is desirable that the output of the air pump be communicated to the upstream port at the cylinder heads, the microprocessor transmits a signal to the solenoid valve 88 actuating the latter to communicate those portions of the conduit 86 upstream and downstream of the valve 88 with each other. At the same time, a signal is transmitted to the solenoid valve 92, moving the latter into the dashed position in the drawings to thereby communicate a pressure signal into the compartment 48. The pressure signal in the compartment 48 is greater than the atmospheric pressure level of compartment 46, since the pressure level in compartment 46 is bled off to atmosphere through the orifice 104. Accordingly, the diaphragm assembly 39 will be urged upwardly viewing the FIGURE, thereby forcing the plunger 28 upwardly, to move the valve element 56 off the valve seat 26, to thereby permit substantially uninhibited fluid communication from the inlet 16 to the outlet 18. At the same time, the operation of the solenoid valve 88 communicates a pressure signal to the branch 90 into the pressure chamber 70 where it acts on the face of the piston 66, thereby moving the latter to the left viewing the FIGURE into engagement with the stop 83 to increase the preload of the spring 82 to thereby hold the valve member 74 into sealing engagement with the seat 76. Accordingly, substantially all of the input through the inlet 16 is communicated to the outlet 18, unless an overpressure condition occurs in which the pressure level acting on the valve member 74 is so great that it overcomes the increased preload on the spring 82.

When the aforementioned microprocessor senses a vehicle operating condition in which injection of air in the catalytic converter is required, the microprocessor transmits a signal actuating the solenoid valve 88 but permitting the solenoid valve 92 to remain de-energized. Accordingly, an air pressure signal is communicated through the conduit means 86 including branch 90 to the pressure chamber 70 in order to hold the valve member 74 closed unless an over-pressure condition exists as described hereinabove. Upon actuation of the solenoid valve 88, an air pressure signal also is communicated through the solenoid valve 92 to the branch 94 and into the compartment 46 of the actuating chamber 36. Of course, the pressure level in compartment 48 is substantially atmospheric pressure because of the atmospheric bleed 102. The higher pressure level in the compartment 46 acting across the diaphragm assembly 38 urges the plunger 28 downwardly viewing the FIGURE, thereby forcing the valve member 54 away from the valve seat 24 in opposition to the force of the spring 58. Accordingly, substantially uninhibited fluid communication is permitted from the inlet 16 to the outlet 20 and therefore to the vehicle catalytic converter.

I claim:

1. In a pressure control system a housing having an inlet communicated to a fluid pressure source providing a pressure level greater than atmospheric pressure and a pair of outlets, primary valve means controlling communication between said inlet and said outlets, said primary valve means including a pressure differential diaphragm means for actuating said primary valve means from a first condition in which said primary valve means closes one of said outlets and communicates the other of said outlets to said inlet, said primary valve means being actuated to a second condition in which said primary valve means closes said other of said outlets and opens the one outlet to said inlet, said system including a pressure tap for generating a pressure signal from the pressure level communicated to said inlet from said pressure source, conduit means including a pair of branches for communicating said pressure signal from said tap to opposite sides of said pressure differential responsive diaphragm means, and electrically actuated valve means controlling communication through said branches to cause said diaphragm means to actuate said primary valve means between said first and second conditions and wherein said housing further includes a vent communicating said inlet to atmosphere, relief valve means within said housing for controlling communication between the inlet and vent as a function of the pressure differential thereacross, said relief valve means including pressure signal responsive means for controlling the pressure differential required to open said relief valve means, and an electrically activated valve mechanism for controlling communication of a pressure signal between said tap and said pressure signal responsive means, said relief valve means further including a valve seat on said housing, a valve poppet slidably mounted in said housing, preloaded resilient means yieldably urging said valve poppet into sealing engagement with said valve seat, said pressure signal responsive means being responsive to said pressure signal for changing the preload of said resilient means and wherein said pressure signal responsive means includes a piston slidably mounted in said housing, said piston defining a pressure responsive face communicated to said tap through said electrically activated valve mechanism, said piston further including a support for slidably mounting said valve poppet, said resilient means being located between the piston and the valve poppet, so that movement of the piston in response to said pressure signal increases the preload of said resilient means whereby the pressure differential between the inlet and the vent required to open said relief valve means is also increased.

2. In a pressure control system a housing having an inlet communicated to a fluid pressure source providing a pressure level greater than atmospheric pressure and a pair of outlets, primary valve means controlling communication between said inlet and said outlets, said primary valve means including a pressure differential diaphragm means for actuating said primary valve means from a first condition in which said primary valve means closes one of said outlets and communicates the other of said outlets to said inlet, said primary valve means being actuated to a second condition in which said primary valve means closes said other of said outlets and opens the one outlet to said inlet, said system including a pressure tap for generating a pressure signal from the pressure level communicated to said inlet from said pressure source, conduit means including a pair of branches for communicating said pressure signal from said tap to opposite sides of said pressure differential responsive diaphragm means, and electrically actuated valve means controlling communication through said branches to cause said diaphragm means to actuate said primary valve means between said first and second conditions and wherein said housing further includes a vent communicating said inlet to atmosphere, relief valve means within said housing for controlling communication between the inlet and vent as a function of the pressure differential thereacross, said relief valve means including pressure signal responsive means for controlling the pressure differential required to open said relief valve means, and an electrically activated valve mechanism for controlling communication of a pressure signal between said tap and said pressure signal responsive means and wherein said primary valve means is actuable to a third condition in which communication from said inlet to both of said outlets is prevented, said pressure responsive means and said electrically activated valve mechanism reducing the pressure differential required to open said relief valve means when the primary valve means is in said third position and increasing the pressure differential required to open said relief valve means when the primary valve means is in either of the first or second positions.

3. In a pressure control system a housing having an inlet communicated to a fluid pressure source providing a pressure level greater than atmospheric pressure and a pair of outlets, primary valve means controlling communication between said inlet and said outlets, said primary valve means including a pressure differential diaphragm means for actuating said primary valve means from a first condition in which said primary valve means closes one of said outlets and communicates the other of said outlets to said inlet, said primary valve means being actuated to a second condition in which said primary valve means closes said other of said outlets and opens the one outlet to said inlet, said system including a pressure tap for generating a pressure signal from the pressure level communicated to said inlet from said pressure source, conduit means including a pair of branches for communicating said pressure signal from said tap to opposite sides of said pressure differential responsive diaphragm means, and electrically actuated valve means controlling communication through said branches to cause said diaphragm means to actuate said primary valve means between first and second conditions and wherein said primary valve means is actuable to a third condition in which communication from said inlet to both of said outlets is prevented, and an electrically actuated valve mechanism in said conduit between said tap and said electrically actuated valve means, said electrically actuated valve mechanism being actuable from a normal condition in which said conduit and both of said branches is vented to atmosphere to thereby communicate said opposite sides of said pressure differential diaphragm means to atmospheric pressure to an actuated position permitting said electrically actuated valve means to communicate one of said branches with said tap.

4. The pressure control system as claimed in claim 3, further characterized in that said primary valve means includes spring means yieldably urging said primary valve means into said third condition when the pressure level on said opposite sides of said pressure differential diaphragm means are equal.

5. In a pressure control system a housing having an inlet communicated to a fluid pressure source providing a pressure level greater than atmospheric pressure and a pair of outlets, primary valve means controlling communication between said inlet and said outlets, said primary valve means including a pressure differential diaphragm means for actuating said primary valve means from a first condition in which said primary valve means closes one of said outlets and communicates the other of said outlets to said inlet, said primary valve means being actuated to a second condition in which said primary valve means closes said other of said outlets and opens the one outlet to said inlet, said system including a pressure tap for generating a pressure signal from the pressure level communicated to said inlet from said pressure source, conduit means including a pair of branches for communicating said pressure signal from said tap to opposite sides of said pressure differential responsive diaphragm means, and electrically actuated valve means controlling communication through said branches to cause said diaphragm means to actuate said primary valve means between said first and second conditions and wherein said housing further includes a vent communicating said inlet to atmosphere, relief valve means within said housing for controlling communication between the inlet and vent as a function of the pressure differential thereacross, said relief valve means including pressure signal responsive means for controlling the pressure differential required to open said relief valve means, and an electrically activated valve mechanism for controlling communication of a pressure signal between said tap and said pressure signal responsive means and wherein said conduit means includes a third branch communicated to said pressure signal responsive means, said third branch being located between said tap and said first and second branches, said electrically actuated valve mechanism being located between said tap and said third branch and wherein said electrically actuated valve mechanism is shiftable from a normal orientation venting all of said branches to an actuated orientation communicating said third branch and said electrically actuated valve means to said tap, said electrically actuated valve means being actuable from a normal orientation communicating one of said first and second branches to said third branch and venting the other of said first and second branches, said electrically actuated valve means being shiftable to an actuated orientation communicating the other of said first and second branches to said third branch and venting said one of said first and second branches.

* * * * *